No. 758,549. PATENTED APR. 26, 1904.
C. H. MELIUS.
SHAFT COLLAR.
APPLICATION FILED MAY 2, 1903.
NO MODEL.
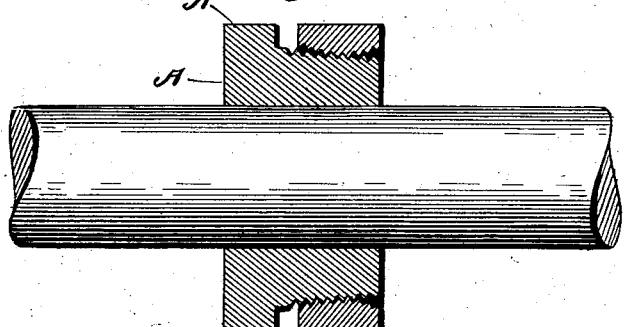
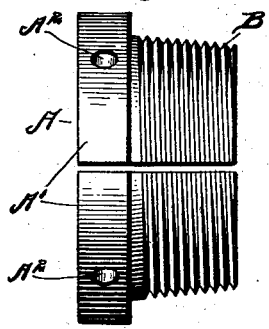 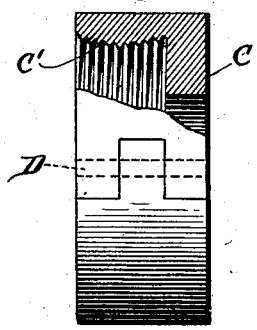 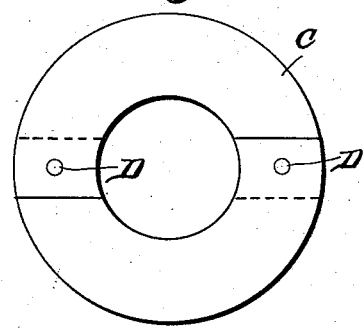
Witnesses:
Louis D. Heinrichs
L. H. Morrison
Inventor
Charles H. Melius
By his Atty No. 758,549. Patented April 26, 1904.

UNITED STATES PATENT OFFICE.

CHARLES H. MELIUS, OF GLOVERSVILLE, NEW YORK.

SHAFT-COLLAR.

SPECIFICATION forming part of Letters Patent No. 758,549, dated April 26, 1904.

Application filed May 2, 1903. Serial No. 155,264. (No model.)

*To all whom it may concern:*

Be it known that I, CHARLES H. MELIUS, a citizen of the United States, residing at Gloversville, county of Fulton, and State of New York, have invented a certain new and useful Improvement in Shaft-Collars, of which the following is a specification.

My invention relates to a new and useful improvement in shaft-collars, and has for its object to provide a shaft-collar which may be secured to the shaft in any position without the use of set-screws.

With these ends in view this invention consists in the details of construction and combination of elements hereinafter set forth and then specifically designated by the claim.

In order that those skilled in the art to which this invention appertains may understand how to make and use the same, the construction and operation will now be described in detail, referring to the accompanying drawings, forming a part of this specification, in which—

Figure 1 is a sectional view showing my improved collar applied to a shaft; Fig. 2, a side elevation of the male part of the collar; Fig. 3, a side elevation of a modified form of the female part of the collar, a portion being broken away and shown in section; Fig. 4, a face view of Fig. 3.

Ordinary shaft-collars are generally in the form of a continuous ring, and it is necessary to slip the same over the ends of the shaft, and the collar is secured in place by transverse set-screws.

In my invention in the construction shown in Figs. 1, 2, 3, and 4 A represents the male portion of the collar, which is formed in two semicircular parts, which may be placed around the shaft, so that the two halves when upon the shaft will form a circle. The part A is provided with the annular flange A', which may be polygonal in form for a wrench-hold or may be provided with radial holes A², so that a spanner can be used. The balance of the part A consists of a tapering exterior-screw-threaded portion B. C represents the female part or nut, which is interiorly threaded, as represented at C', with a curved thread, so that the threaded portion is convex. The halves of the part A when arranged upon the shaft do not come in close contact with one another, but are a slight distance apart, so that when the nut C is threaded upon the portion B the halves of the part A will be drawn together and tightly clamped upon the shaft. The exterior of the part C may be made polygonal or may be provided with holes for a spanner. As the sections of the part H are slightly separated, the nut will engage the threads of the sections, and owing to the convex threaded portion the sections are drawn together with a few turns of the nut. This part C, as shown in Figs. 3 and 4, is also made in halves, so that the same can be arranged around the shaft without the necessity of slipping the same over the end of the shaft. These two halves may be secured together in any suitable manner. As shown in the drawings, they are mortised one into the other, and pins D extend through one half and also through the tongue of the other half, so that the two halves are held securely together.

The advantage of my improved collar is in the great convenience with which the collar may be applied and adjusted to any position upon the shaft, doing away with all set-screws. Another great advantage of my invention is that the same can be so secured to the shaft that it is almost impossible to move the same and will retain its position much better than a collar depending upon a set-screw for holding the same, and at the same time my collar does not mar the shaft, as is done when set-screws are used.

Of course I do not wish to be limited to the exact construction here shown, as slight modifications could be made without departing from the spirit of my invention.

Having thus fully described my invention, what I claim as new and useful is—

A shaft-collar consisting of two longitudinally-divided parts adapted to fit around a shaft, a tapered threaded portion formed on one of the parts and an internally-threaded convex wall formed on the other part, the last-named part having its sections connected by tongue and mortise secured by a pin, substantially as described.

In testimony whereof I have hereunto affixed my signature in the presence of two subscribing witnesses.

CHAS. H. MELIUS.

Witnesses:
JOHN L. GETMAN,
WM. F. STEELE.